US009232355B1

(12) United States Patent
Roskind

(10) Patent No.: US 9,232,355 B1
(45) Date of Patent: *Jan. 5, 2016

(54) DIRECTIONAL FEEDBACK

(71) Applicant: Google Inc., Mountain View, CA (US)

(72) Inventor: James Roskind, Redwood City, CA (US)

(73) Assignee: Google Inc., Mountain View, CA (US)

(*) Notice: Subject to any disclaimer, the term of this patent is extended or adjusted under 35 U.S.C. 154(b) by 155 days.

This patent is subject to a terminal disclaimer.

(21) Appl. No.: 13/908,818

(22) Filed: Jun. 3, 2013

Related U.S. Application Data

(63) Continuation of application No. 13/077,268, filed on Mar. 31, 2011, now Pat. No. 8,457,654.

(51) Int. Cl.
H04W 4/02 (2009.01)
G01C 21/20 (2006.01)

(52) U.S. Cl.
CPC .............. H04W 4/026 (2013.01); G01C 21/20 (2013.01)

(58) Field of Classification Search
CPC ............... H04W 64/006; H04W 4/025–4/028
USPC ....................................... 455/456.1; 701/213
See application file for complete search history.

(56) References Cited

U.S. PATENT DOCUMENTS

| 5,270,936 A | 12/1993 | Fukushima et al. |
| 5,442,557 A | 8/1995 | Kaneko |
| 5,864,125 A | 1/1999 | Szabo |
| 5,964,821 A | 10/1999 | Brunts et al. |
| 6,067,046 A * | 5/2000 | Nichols .............. G01C 15/00 342/357.31 |
| 6,070,124 A | 5/2000 | Nimura et al. |
| 6,154,703 A | 11/2000 | Nakai et al. |
| 6,278,940 B1 | 8/2001 | Endo |
| 6,389,358 B2 | 5/2002 | Uchigaki |
| 6,426,719 B1 | 7/2002 | Nagareda et al. |
| 6,430,411 B1 | 8/2002 | Lempio et al. |
| 6,434,482 B1 | 8/2002 | Oshida et al. |
| 6,526,351 B2 | 2/2003 | Whitham |
| 6,600,994 B1 | 7/2003 | Polidi |
| 6,671,618 B2 | 12/2003 | Hoisko |
| 6,762,696 B2 | 7/2004 | Hulverscheidt et al. |
| 6,862,525 B1 | 3/2005 | Beason et al. |
| 6,975,959 B2 | 12/2005 | Dietrich et al. |

(Continued)

OTHER PUBLICATIONS

Prosecution History from U.S. Pat. No. 8,457,654 from Oct. 11, 2012 through Feb. 4, 2013, 38 pp.

(Continued)

Primary Examiner — George Eng
Assistant Examiner — Joseph Dean, Jr.
(74) Attorney, Agent, or Firm — Fish & Richardson P.C.

(57) ABSTRACT

This disclosure is directed to providing directional feedback to a user. For example, this disclosure describes techniques for determining at least one characteristic of a device in space. For example, a device may be configured to determine, using one or more sensors, one or more characteristics of the device in space. For example, the device may be configured to determine one or more of a direction, and/or geographical position of the device as pointed by a user in space. The device may compare one or more of the determined one or more characteristics of the device in space to a desired destination or path specified by the user, and provide the user with directional feedback if the determined one or more characteristics of the device in space are consistent with the desired destination or path.

18 Claims, 7 Drawing Sheets

(56) References Cited

U.S. PATENT DOCUMENTS

| | | |
|---|---|---|
| 6,983,203 B1 | 1/2006 | Wako |
| 7,260,473 B2 | 8/2007 | Abe et al. |
| 7,440,851 B2 | 10/2008 | Friedrichs et al. |
| 7,592,999 B2 | 9/2009 | Rosenberg et al. |
| 7,598,856 B1 | 10/2009 | Nick et al. |
| 7,788,032 B2 | 8/2010 | Moloney |
| 7,826,965 B2 | 11/2010 | Sadri et al. |
| 8,280,404 B1 | 10/2012 | Roskind |
| 8,457,654 B1 | 6/2013 | Roskind |
| 8,508,486 B2 | 8/2013 | Grant et al. |
| 8,526,677 B1 | 9/2013 | Crichton et al. |
| 2002/0004704 A1 | 1/2002 | Nagatsuma et al. |
| 2002/0047787 A1 | 4/2002 | Mikkola et al. |
| 2003/0008671 A1 | 1/2003 | Lundgren et al. |
| 2006/0061545 A1 | 3/2006 | Hughes et al. |
| 2006/0152382 A1 | 7/2006 | Hiltunen |
| 2007/0203642 A1 | 8/2007 | Arnold-Huyser |
| 2008/0065326 A1* | 3/2008 | Hoashi ............... G01C 21/20 701/432 |
| 2008/0109164 A1 | 5/2008 | Matsunaga et al. |
| 2008/0120029 A1 | 5/2008 | Zelek et al. |
| 2008/0194323 A1 | 8/2008 | Merkli et al. |
| 2009/0076723 A1* | 3/2009 | Moloney ............ G01C 21/3652 701/472 |
| 2012/0166077 A1 | 6/2012 | Herzog et al. |

OTHER PUBLICATIONS

Prosecution History for U.S. Pat. No. 8,280,404 from Dec. 29, 2011 through May 31, 2012, 37 pp.

"Enkin: navigation reinvented," [retrieved on Nov. 12, 2009]. Retrieved from the Internet: http://www.enkin.net/ (1 page).

"Wikitude," [retrieved on Nov. 12, 2009]. Retrieved from the Internet: http://www.wikitude.org/ (2 pages).

"Where GPS Mobile Application for the iPhone, BlackBerry, Google Android & Palm Pre," [retrieved on Nov. 12, 2009]. Retrieved from the Internet: http://www.where.com/ (6 pages).

"OpenTable: 27/7 Online Reservations," [retrieved on Nov. 12, 2009]. Retrieved from the Internet: http://www.opentable.com/info/aboutus.aspx (1 page).

"Washington DC, Restaurants/Urbanspoon," [retrieved on Nov. 12, 2009]. Retrieved from the Internet: htto://www.urbanspoon.com/c/7/Washington-DC-restaurants.html (6 pages).

"AroundMe," [retrieved on Nov. 12, 2009]. Retrieved from the Internet: http://www.tweakersoft.com/mobile/aroundme.html (2 pages).

"FAQ/Yelp", [retrieved on Nov. 12, 2009]. Retrieved from the Internet: http://www.yelp.com/faq (5 pages).

* cited by examiner

DIRECTIONAL FEEDBACK

This application is a continuation of U.S. application Ser. No. 13/077,268, filed Mar. 31, 2011, the entire content of which is incorporated herein by reference.

TECHNICAL FIELD

In general, this disclosure is directed to techniques for providing navigational instructions to a user of mobile device.

BACKGROUND

In recent years, mobile devices that are configured to detect a user's position, e.g., devices that include global positioning system (GPS) functionality, have become increasingly popular with consumers. A GPS system may be configured to determine a user's geographic location on the earth, e.g., a latitude and/or longitude. Such devices may be configured to execute application software that interfaces with device sensors and/or network-accessible information to determine a user's geographic location.

GPS-enabled devices may provide a user with feedback, such as a graphical depiction of a map that may be updated to show a user's location and/or a desired directional path. Some GPS enabled devices further provide a user with verbal or textual feedback indicating a desired path for the user. Still other GPS-enabled devices provide a user with alternate forms of feedback for navigation purposes, such as a vibration, simulated voice prompt, or other form of alarm when the user has strayed from a desired path.

Other GPS-enabled devices may provide a user with feedback relative to the earth's directional poles in addition to a global position such as a provided by a GPS unit. For example, some mobile device navigation systems may utilize a magnetometer to determine a user's direction with respect to the magnetic poles of the earth (e.g., north, south, east, west). Such systems may update a graphical depiction of a map based on the user's directional focus.

SUMMARY

Some techniques for providing navigational feedback may suffer from certain drawbacks in environments where navigational feedback might be helpful. For example, a user may desire to receive navigational feedback from a mobile device in an environment that is noisy, crowded, and/or makes viewing a display of the device difficult or even impossible (e.g., a crowded amusement park or in a noisy urban area on a sunny day). Some techniques may be undesirable under such circumstances, because noise may render audio feedback (e.g., verbal instructions or other audible sounds) difficult or even impossible to hear. Similarly, graphical feedback from a mobile device display may not be easily viewable in direct sunlight. Increasing an intensity of a display may improve a user's ability to view the display in sunlight. This, however, this may cause an undesirable drain on battery power of the device.

This disclosure is directed to improvements in mobile device navigational instructions. The techniques described herein are generally directed to a mobile device that a user may "point" in a particular location with a particular orientation, altitude, and/or direction and provide the user with directional feedback that the direction/orientation the user is pointing the device in is consistent with a desired destination of the user, or a path to the desired destination. In some examples, the directional feedback may be palpable, or easily detectable, feedback (e.g., a vibration or easily detectable light such as a high intensity strobe light).

The techniques of this disclosure may be implemented using various sensors of a mobile device or other information available to the mobile device. For example, sensors of a mobile device, such as one or more of an accelerometer, magnetometer, and gyroscope sensors may be utilized to determine a direction, altitude, and/or orientation of the device as pointed by the user. The mobile device may further be configured to determine a global location of the mobile device. The mobile device may be configured to identify, based on the determined orientation, direction, altitude and/or global location of the mobile device, whether or not the user has pointed the mobile device at a desired destination of the user, or along a path leading to the desired destination of the user.

In some examples, a device configured to operate consistent with the techniques of this disclosure may provide a user with directional feedback indicating that device is pointed consistent with a desired path or destination. In some examples, the directional feedback may be palpable or easily detectable by a user. According to one example, the device may be configured to provide haptic directional feedback. For example, the device may provide feedback in the form of vibrations of the mobile device. For example, if the user is pointing the mobile device at a desired destination or path to a desired destination, the mobile device may vibrate, thus indicating to the user to travel in the direction the user was pointing. In another example, directional feedback may be communicated to the user visually. For example, directional feedback may be communicated to the user in the form of a high intensity light, e.g., using one or more strobe LED (light-emitting diodes) of the mobile device. This technique may provide a user with a palpable indication of navigational feedback, without causing a significant battery drain for the mobile device. According to other examples, directional feedback may be communicated to the user in the form of a high-intensity light provided using a display screen of the mobile device.

According to one example, a method is described herein. The method includes receiving, by a mobile device, an indication of a desired physical destination of a user of the mobile device. The method further includes detecting, by the mobile device, an orientation of the mobile device in space, a direction in which at least one defined portion of the mobile device is pointed in space, and a geographic location of the mobile device. The method further includes comparing the detected orientation, direction, and geographic location of the mobile device to the desired physical destination of the user of the mobile device. The method further includes when the detected orientation, direction, and geographic location of the mobile device are consistent with the desired physical destination, providing the user with at least one indication that the orientation, direction, and geographic location are consistent with the desired physical destination.

According to another example, a mobile device is described herein. The mobile device includes a user input module configured to receive from a user at least one indication of a desired physical destination of the user. The mobile device further includes a sense module configured to detect, using at least one sensor of the mobile device, an orientation of the mobile device in space, a direction in which at least one defined portion of the mobile device is pointed in space, and a geographic location of the mobile device. The mobile device further includes means for comparing the detected orientation, a direction, and a geographic location to the desired destination of the user of the mobile device. The mobile device further includes an output module configured to, when the detected orientation, direction, and geographic location are consistent with the desired destination, provide the user with at least one indication that the orientation, direction, and geographic location are consistent with the desired physical destination.

According to another example, a computer-readable storage medium is described herein. The computer-readable storage medium includes instructions configured to cause a computing device to receive an indication of a desired physical destination of a user of a mobile device. The instructions further cause the computing device to detect an orientation of the mobile device in space, a direction in which at least one defined portion of the mobile device is pointed in space, and a geographic location of the mobile device. The instructions further cause the computing device to compare the detected orientation, a direction, and a geographic location to the desired physical destination of the user of the mobile device. The instructions further cause the computing device to when the detected orientation, direction, and geographic location are consistent with the desired physical destination, provide the user with at least one indication that the orientation, direction, and geographic location are consistent with the desired destination.

The details of one or more examples are set forth in the accompanying drawings and the description below. Other features, objects, and advantages of these examples will be apparent from the description and drawings, and from the claims.

DETAILED DESCRIPTION

Figure 1:
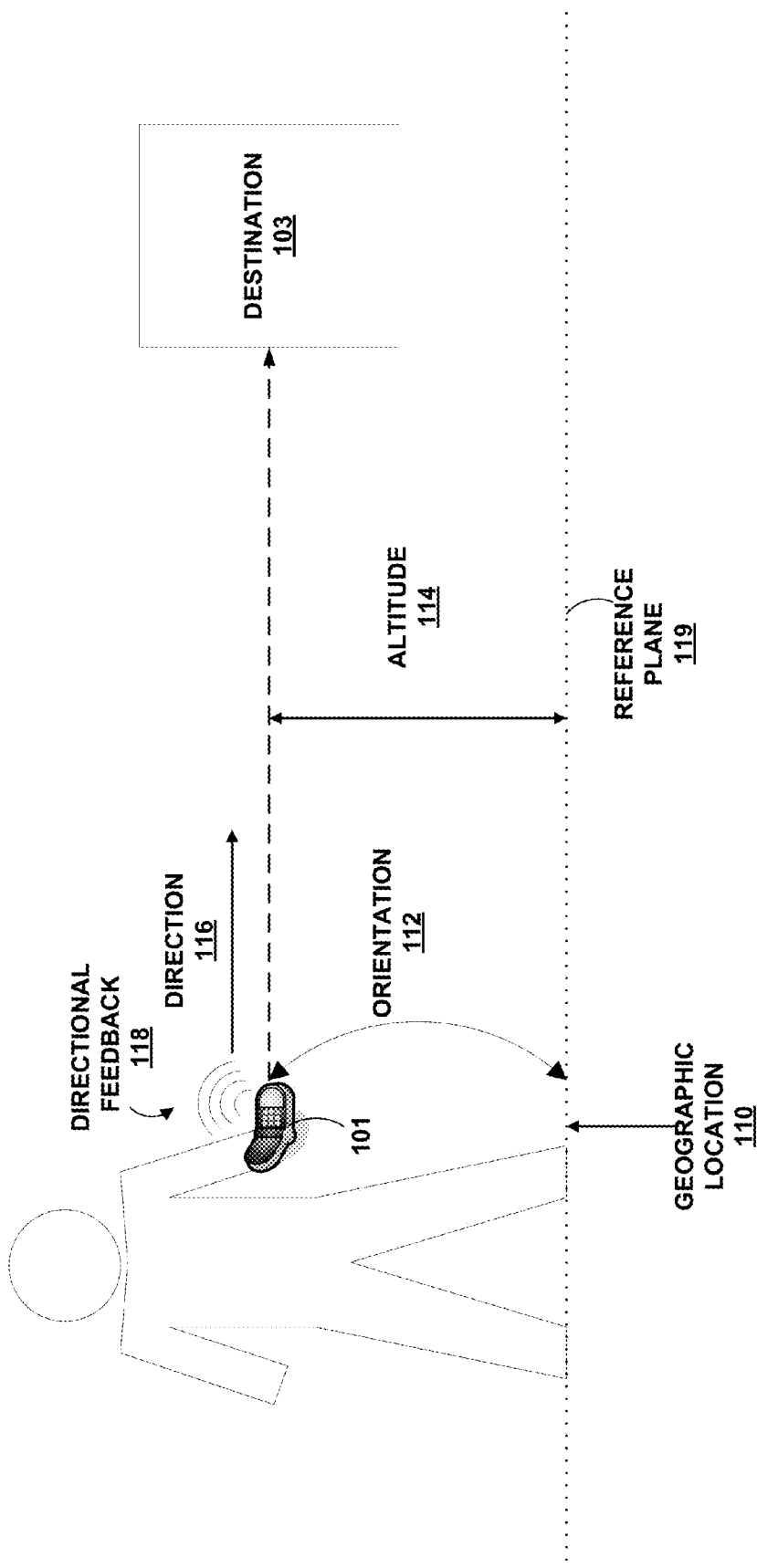
FIG. 1 is a conceptual diagram that illustrates one example of a mobile device used to provide directional feedback consistent with the techniques of this disclosure.

FIG. 1 is a conceptual diagram that illustrates one example of a mobile device 101 that may be operated in accordance with the techniques of this disclosure. As shown in FIG. 1, a user 102 may desire to travel to a physical destination 103. The user may desire to receive guidance from device 101 to assist the user to locate destination 103. Device 101 pictured in FIG. 1 is a cellular phone. Device 101 however may include any type of portable computing device that includes one or more sensors as described herein. For example, device 101 may be a laptop computer, netbook computer, smartphone, tablet computer, wearable computing device (e.g., a watch or similar wearable computing device), or any other device that includes one or more sensors as described in further detail below. The example device 101 depicted in FIG. 1 is a clamshell-type cellular phone. In other examples not depicted in FIG. 1, the techniques of this disclosure may also be applicable to a non-clamshell type mobile device, such as a smart phone that relies primarily on user touch, and includes a minimum of physical buttons.

Consistent with the techniques of this disclosure, as shown in FIG. 1, device 101 may be configured to provide a user with feedback regarding a desired physical destination 103 of user 102 based on detecting one or more conditions of device 101. For example, device 101 may be configured to detect, based on one or more sensors of device 101, one or more characteristics of mobile device 101 in space, e.g., one or more indications of a user pointing device 101 in space. For example, device 101 may detect one or more indications of mobile device 101 in space such as a geographical location 110 of device 101 (e.g., global positioning system (GPS) coordinates of device 101), an orientation 112 of device 101 (e.g., an angle of inclination of device with respect to a reference plane 119), an altitude 114 of device 101 (e.g., a height of device 101 with respect to reference plane 119), and/or a direction 116 of device 101 (e.g., a direction at which device 101 is pointed with respect to one or more magnetic poles of the earth, such as whether the device is pointed north, south, east, or west).

In response to detecting the one or more indications of mobile device 101 in space, device 101 may provide a user with one or more indications regarding a desired destination of user 102. For example, device 101 may provide user 102 with one or more indications that device 101 is pointed in a direction consistent with a desired path to travel to desired destination 103. As another example, device 101 may provide user 102 with one or more indications that device 101 is pointed directly at destination 103. In some examples, the one or more indications may include a palpable indication such as a may be a haptic indication, such as a vibration of device 101. According to other examples, the one or more indications may include a highly visible indication such as a high intensity light, e.g., light emitted by one or more LEDs of device 101 or a display screen of device 101. For example, a bright LED that briefly flashes on and off may be highly visible even in extremely bright ambient conditions.

Various examples are described herein where a device 101 is configured to detect one or more characteristics of device 101 pointed in space. For example, device 101 may be configured to detect that a user has held out device 101 (e.g., in front of the user) in a particular direction. In some examples, device 101 may be configured to detect one or more characteristics (e.g., orientation, direction, altitude, whether the device is in an open/closed configuration) of device 101 with respect to one or more defined portions of device 101. For example, device 101 may be configured to detect one or more characteristics with respect to a top portion of device (e.g., a top portion as device 101 is held by a user to view a display of device), a bottom portion, or any other portion of device 101. According to other examples, device 101 may be configured to detect the above-described one or more characteristics with respect to an axis of device. For example, where device 101 has a rectangular shape, device 101 may be configured to detect the above-described one or more characteristics with respect to an axis in parallel with one or more longer sides of device 101.

In some examples, device 101 may be configured to detect one or more characteristics of device 101 pointed in space based on receipt of user input identifying a portion, axis, or other aspect of device for which device 101 may determine one or more characteristics of device 101 pointed in space. For example, device 101 may be configured to receive user input identifying a top, bottom, or side portion of device 101 that device 101 may use as a reference to determine one or more characteristics of device 101 pointed in space. According to other examples, device 101 may be configured to automatically determine a reference portion of device 101 to be used as a reference to determine one or more characteristics of device 101 pointed in space. For example, device 101 may be configured to determine a portion (e.g., a top or bottom) of device 101 that is closest to a user, and use a portion of device 101 furthest away from the user as a reference to determine one or more characteristics of device 101 pointed in space.

The techniques described above may be beneficial for a number of reasons. For example, instead of providing user 102 with a displayed map of a geographical location that the user must interpret and correlate with an actual environment of user 102 (e.g., streets, buildings, other landmarks), user 102 may use device 101 to quickly ascertain a desired path to or location of destination 103 by merely pointing device 101 in space until device 101 provides one or more indications of directional feedback. As such, user 102 may be able to navigate to a desired destination with less time and effort than map/voice-text prompt based techniques for directional guidance.

In some examples, these techniques may be useful in noisy, crowded, or highly lit conditions where other forms of directional feedback (e.g., audible sound, graphical display or directional feedback) are undesirable. For example, where user 102 desires to locate a destination 103 comprising a location of another user in a crowded, loud, or bright conditions where other forms of feedback are difficult for the user to interpret, the user may merely point his/her device to determine a location of the destination 103 (e.g., the other user), to determine a location of and/or path to destination 103. For example, a user may point device 101 in various directions/ orientations/inclinations until device 101 provides a user with directional feedback that indicates that device 101 is being pointed at a desired destination 103 or a path to a desired destination 103.

According to another example, the techniques of this disclosure may be desirable because they may provide user 102 with more detailed information than the above-described traditional map/voice-text prompt-based techniques. For example, by providing directional feedback based on detecting characteristics of a user pointing device 101, device 101 may provide a user with feedback indicating a vertical elevation of a desired destination 103. For example, if a user desires direction to a destination that may be on a different floor of a building (e.g., a shopping mall) than the user, the user may point device 101 upwards, to determine that destination 103 is at a higher elevation (e.g., a higher floor) than user 102.

Figure 2:
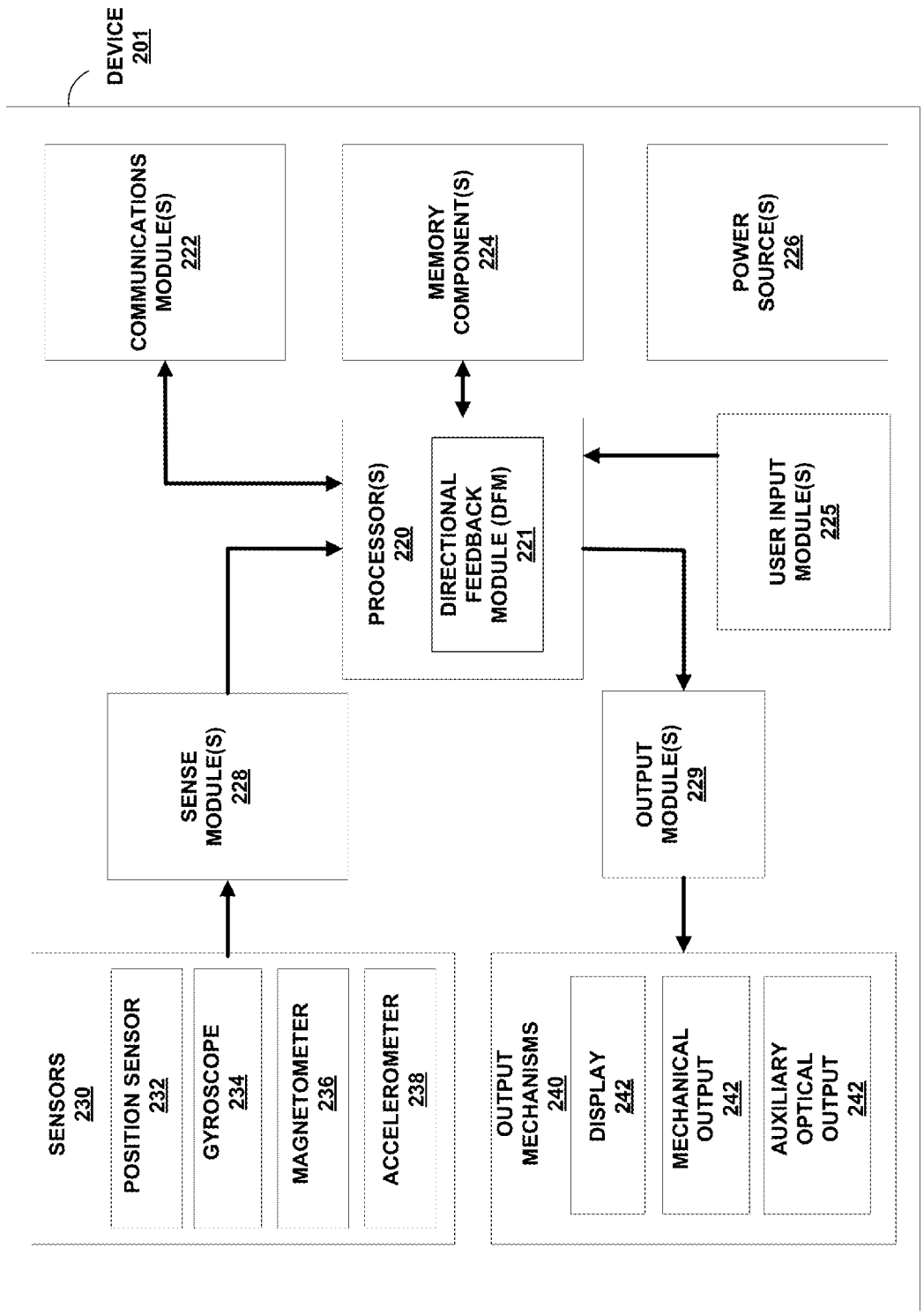
FIG. 2 is a block diagram that illustrates one example of a mobile device configured to operate consistent with the techniques of this disclosure.

FIG. 2 is a block diagram that illustrates one example of a mobile computing device 201 configured to operate consistent with the techniques of this disclosure. As shown in FIG. 2, device 201 includes one or more processors(s) 220 (hereinafter processor 220). Processor 220 may include one or more components of computing device 201 configured to process one or more signals configured to cause device 201 to operate consistent with the techniques of this disclosure. For example, processor 201 may include one or more components (e.g., a central processing unit (CPU) configured to execute one or more program instructions configured to cause device 201 to operate consistent with the techniques of this disclosure. In other examples, processor 201 may include one or more hardware components configured to process one or more physical signals (e.g., electrical, optical, or the like), configured to cause device 201 to operate consistent with the techniques of this disclosure.

As also shown in FIG. 2, device 201 includes one or more memory component(s) 224 (hereinafter memory component 224) and one or more communications module(s) 222 (hereinafter communications module 222). Memory component 224 may comprise one or more components of computing device 201 configured to store data and/or program instructions. For example, Memory component 224 may include one or more temporary (e.g., random access memory (RAM)) and/or long-term (e.g., magnetic hard disk, FLASH memory, optical disc) storage components. In some examples, memory component 224 may store one or more computer-readable instructions that, when executed by processor 220, cause device 201 to operate consistent with the techniques of this disclosure.

Communications module 222 of device 201 may include any hardware and/or software components of device 201 configured to enable device 201 to communicate with one or more other computing devices (not shown in FIG. 2). For example, communications module 222 may include any hardware and/or software component of device 201 configured to enable device 201 to communicate with one or more other devices via a network, such as the Internet. In some examples, processor 220 of device 201 may be configured to execute one or more computer-readable instructions received via communications module 222, instead of or in addition to one or more instructions stored using storage module 224.

As shown in FIG. 2, device 201 may also include one or more power source(s) 226 (hereinafter power source 226). Power source 226 may comprise one or more components configured to store energy (e.g., one or more batteries configured to electrical power energy) to power one or more components of device 201. For example, energy stored by power source 226 may be used to power one or more of processor 220, communications module 222, memory module 224, input module(s) 225 sense module(s) 226, sensors 230, output module(s) 229, and/or output mechanisms 240.

As also shown in FIG. 2, device 201 includes one or more user input module(s) 225 (hereinafter user input module 225). User input module 225 may comprise one or more hardware and/or software components of device 201 configured to receive and/or process input from a user. For example, user input module 225 may be process user input indicating a desired destination of a user. For example, user input module 225 may be configured to receive from a user one or more indications of an address, location name, coordinate, or other indication of a desired destination 103 of a user. Non-limiting examples of user input that may be received by user input module 225 include voice command input, keyboard input, touch sense input (e.g., using a display 242 or other surface of device), and/or any other form of user input configured to indicate a desired destination of a user.

User input module 225 may be configured to communicate one or more indications of a desired destination 103 of a user to direction feedback module (DFM) 221. DFM 221 may be configured to, based on the desired destination 103, determine at least one characteristic of device 201 in space and, based on the at least one determined characteristic, provide feedback (e.g., a palpable indication of the desired destination or path to the desired destination), to a user. For example, as shown in FIG. 2, DFM 221 may receive, from one or more sensor module(s) 228 (hereinafter sensor module 228), at least one indication of device 201 in space detected by one or more sensors 230 of device 201. DFM 221 may, based on the at least one indication of device 120 in space, communicate one or more control signals to an output module 229 of device 201 control one or more output mechanisms 240 of device 201 to provide feedback to a user. For example, DFM 221 may communicate one or more control signals such that a user is provided with at least one indication that at least one characteristic of device 201 in space (e.g., of a user pointing device 201 in space) is consistent with a desired destination 103 or path to desired destination 103 received using user input module 225.

As described above, sensor module 228 may be configured to receive one or more indications of device 201 in space from one or more sensors 230 of device 201. As shown in FIG. 2, the one or more sensors 230 may include at least one position sensor 232. The at least one position sensor 232 may generally be configured to determine a geographical location (e.g., a longitude and/or latitude) of device 201. In one example, position sensor 232 may include a global positioning system (GPS) sensor. In other examples, positions sensor may also or instead include more local positioning sensors, such as systems that use ambient radiation (e.g., a strength of WiFi, Bluetooth, cellular, radio, or television transmissions from identifiable sources) to determine a geographical position of device 201. As also shown in FIG. 2, the one or more sensors 230 may include at least one gyroscope sensor 234 and/or one or more accelerometer sensors 238. The at least one gyroscope sensor 234 and/or accelerometer sensor 238 may be configured to determine an orientation/inclination/altitude of device 201 with respect to a reference plane 119. For example, the at least one gyroscope sensor 234 and/or accelerometer sensor 238 may be configured to determine an orientation/inclination/altitude of device 201 with respect to a reference plane 119 defined by a surface upon which a user operating device 201 is standing. In other examples, the at least one gyroscope sensor 234 and/or accelerometer sensor 238 may be configured to determine movement of device 201. For example, the at least one gyroscope sensor 234 and/or accelerometer sensor 238 may be configured to determine when device 201 has changed orientation/inclination, and/or whether an altitude (e.g., vertical position with respect to a reference plane 119) of device 201 has changed.

As also shown in FIG. 2, the one or more sensor(s) 230 may further include at least one magnetometer sensor 236. The at least one magnetometer sensor 236 may be configured to determine at least one characteristic of a relationship between device 201 and at least one magnetic/electrical property of the Earth. For example, the at least one magnetometer sensor 236 may detect one or more magnetic fields of the Earth and determine a direction in which device 201 is pointing based on the detected one or more magnetic fields.

As described above, sensor module 228 may receive from one or more sensors 230 one or more indications of device 201 in space (e.g., of a user pointing device 201 in space), and process and/or communicate one or more indications of device 201 in space to DFM 221. Based on the one or more indications of device 201 in space, DFM 221 may determine one or more characteristics of device 201, such as a direction, orientation, and/or altitude that device 201 is pointed in. DFM 221 may further determine other characteristics of device such as a geographical location of device 201. DFM 221 may compare the one or more determined characteristics to received desired destination 103 and/or a path to a desired destination 103 (e.g., indicated by user input received from user input module 225).

If the one or more determined characteristics indicate that device 201 is being "pointed" consistent with the desired destination 103 (e.g., pointed at destination 103) and/or a path to a desired destination 103 (e.g., pointed along a path to destination 103), DFM 221 may communicate one or more control signals to cause an indication that device 201 is being pointed consistent with the desired destination 103 and/or path to be communicated to a user. For example, DFM 221 may communicate one or more control signals to output module(s) 229 (hereinafter output module 229).

Output module 229 may be configured to control one or more output mechanisms 240 of device 201 to communicate with a user 102 of device 201. For example output module 229 may be configured to control one or more display(s) 242, one or more mechanical actuators 244 (e.g., configured to cause device 201 to vibrate), and/or one or more auxiliary optical output 244 (e.g., one or more strobe LEDs or other non-display components of device 201 configured to output optically recognizable light) of device 201 to communicate an indication that device 201 is "pointed" consistent with desired destination 103. As described above, by communicating one or more indications that device 201 is pointed consistent with desired destination 103, device 201 may inform a user of a location of destination 103, and/or a path to destination 103, while requiring minimal effort by a user (e.g., to compare a map or verbal instruction to the user's surroundings).

As also described above, operating device 201 as described above may permit a user to use directional feedback as described herein in an environment where other techniques for directional feedback are undesirable. Furthermore, operating device 201 as described above may further enable a user to determine more information regarding a desired destination 103 than other techniques, for example a vertical positioning of a desired destination 103 or path to a desired destination 103.

Figure 3:
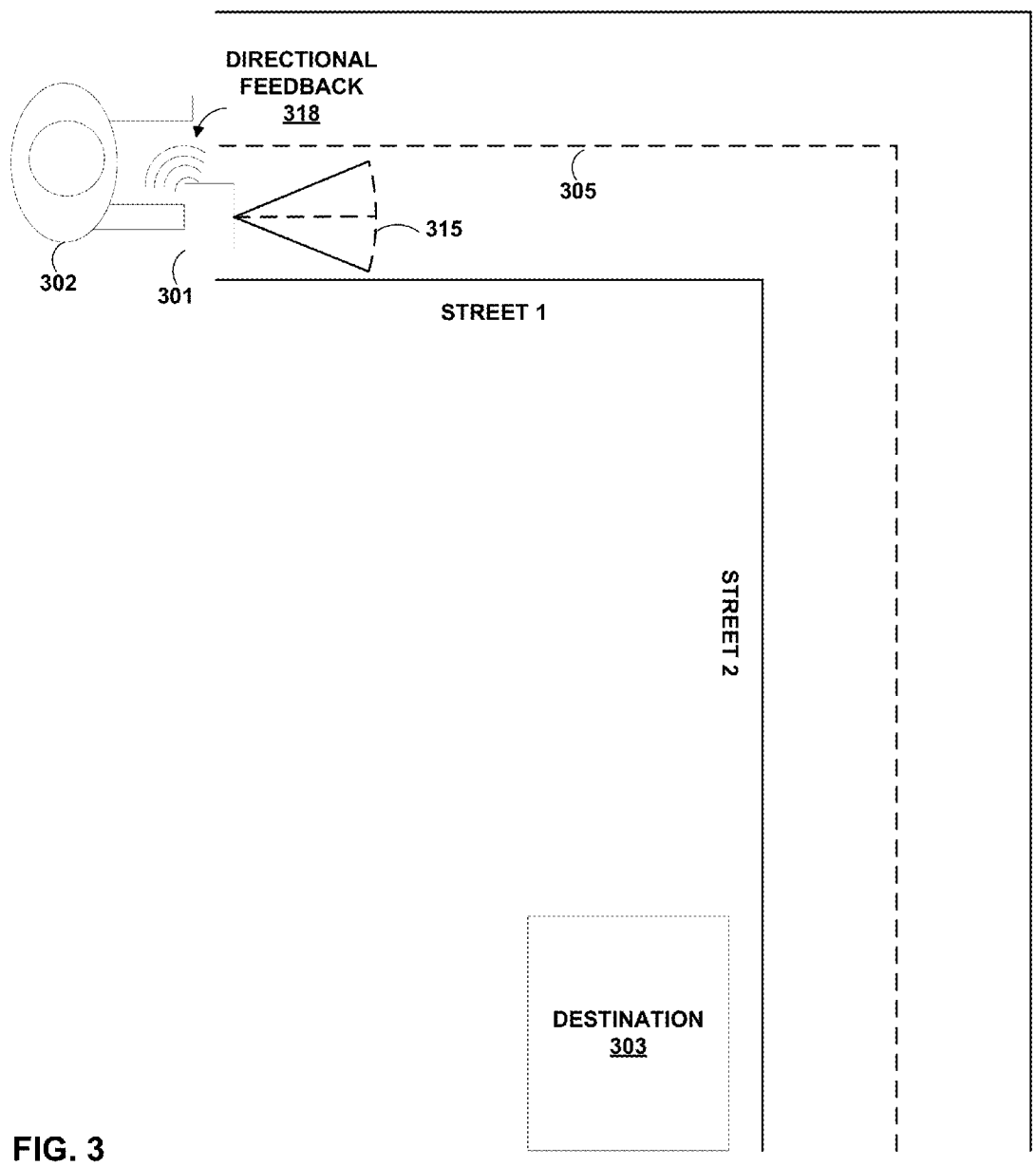
FIG. 3 is a conceptual diagram that illustrates one example of how a mobile device may be used to provide directional feedback in accordance with the techniques of this disclosure.

FIG. 3 is a conceptual diagram that illustrates one example of how a device 301 may be used to provide directional feedback 318 to a user 302, in accordance with the techniques of this disclosure. As depicted in FIG. 3, user 302 may desire assistance to locate a physical destination 303. The user may desire assistance from device 301, which may be a mobile device such as a mobile phone. User 302 may provide device 301 with input indicating destination 303. For example, user 302 may provide an address, and/or geographical coordinate indicating destination 303. According to other examples, a user may input an indirect indication of destination 303. For example, user 302 may submit a name (e.g., of a restaurant) of a desired destination 303. Device 301 may correspondingly determine an address and/or geographical coordinates based on the received destination name. For example, device 301 may be configured to access network-accessible information to determine a desired destination of user 302. As an example, device 301 may be communicatively coupled to one or more network servers or other network-accessible devices configured to store and/or provide geographical mapping information upon request by device 301.

According to other examples, user 302 may desire to locate a person or other device. For example, user 302 may desired to locate another person who him/herself has another portable device. According to this example, user 302 may enter an indication of another person (e.g., address book name), and device 301 may, based on the indication of the another person, determine a location of the other person (e.g., by determining a location of a device associated with the other person). In some examples, device 301 may be configured to communicate with one or more other devices (e.g., a server, wireless tower/hotspot, or other device), in order to determine a location of the other user. Once determined, the location of the other user may be used as destination 303.

FIG. 3 depicts one example where device 301 has determined, based on a destination 303, a desired path 305 to destination 303. As depicted in FIG. 3, desired path 305 includes a user traveling on street 1, taking a right at an intersection between street 1 and a street 2, and traveling down street 2 a distance to destination 303.

As also shown in FIG. 3, device 301 may be configured to provide user 302 with directional feedback 318 if user 301 has pointed device 301 consistent with path 305. For example, if user 302 points device 301 in a direction inconsistent with path 305, e.g., if a user points device 301 towards the left of user 302 as the user is depicted in FIG. 3 (e.g., towards the top of the page of FIG. 3), behind the user 302 as the user is depicted in FIG. 3 (e.g., towards the left with respect to the page of FIG. 3), or to the right of user 302 as the user is depicted in FIG. 3 (e.g., towards the bottom of FIG. 3), device 301 may not provide the user with directional feedback 318. However, if the user points device 301 in the direction shown in FIG. 3 (e.g., towards path 305, towards the right of the page of FIG. 3), device 301 may provide user 302 with directional feedback 318 indicating that device 301 is pointed in a direction consistent with path 305 to destination 303. In some examples, directional feedback 318 may be palpable feedback, such as a vibration of device 301, or the emission of light from one or more of a display (e.g., display 242 depicted in FIG. 2), or one or more ancillary LEDs of device (e.g., ancillary optical output 246 depicted in FIG. 2). In still other examples, directional feedback 318 may instead or in addition include audible feedback, e.g., a voice prompt or alarm indicating that device 301 is pointed in a direction consistent with path 305.

In some examples, device 301 may be configured to determine whether device 301 is pointed consistent with path 305 based on comparison of a detected characteristic of device in space to one or more predetermined thresholds. For example, as shown in FIG. 3, device 301 may be configured to compare a detected characteristic such as a direction (e.g., using a magnetometer sensor 236 as described above) to a predefined horizontal angular range 315 (e.g., 30 degrees, 60 degrees) to determine whether device 301 is pointed consistent with path 305. For example, if the predefined horizontal angular range 315 is 30 degrees, device 301 may determine that device 301 is held consistent with path 305 if device is held in a direction between −15 and +15 degrees with respect to an actual direction of path 305. If device is held at a position outside of −15 and +15 degrees with respect to an actual direction of path 305, device 301 may not provide directional feedback 318 to user 302.

Figure 4:
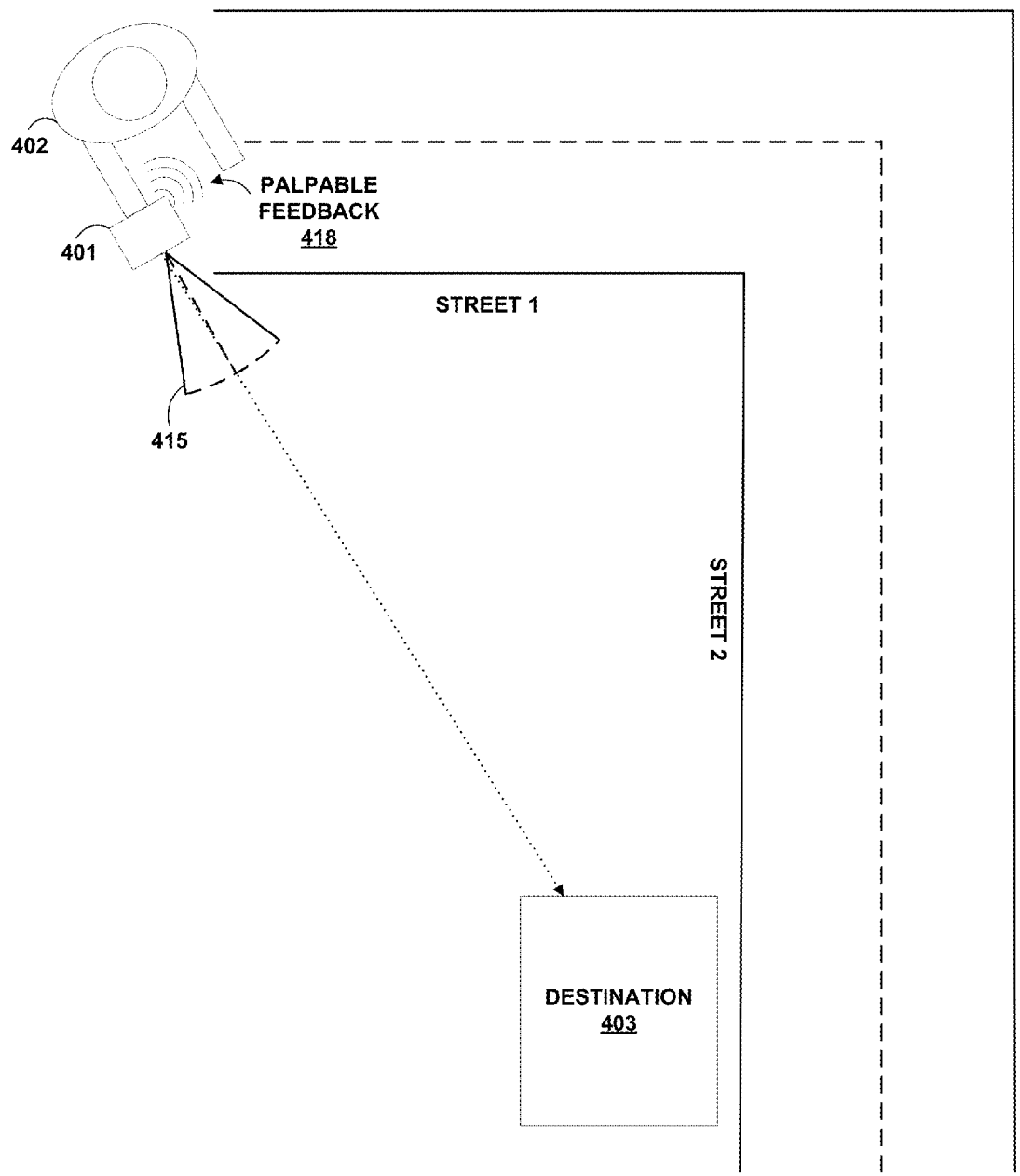
FIG. 4 is a conceptual diagram that illustrates one example of how a mobile device may be used to provide directional feedback in accordance with the techniques of this disclosure.

FIG. 4 is a conceptual diagram that illustrates one example of how a device 401 may be used to provide directional feedback 418 to a user 402, in accordance with the techniques of this disclosure. The example depicted in FIG. 4 is substantially similar to the example depicted in FIG. 3, where user 402 desires assistance to locate destination 403. However, according to the example of FIG. 4, device 401 may be configured to provide directional feedback to user 402 based on whether device 401 detects that the user is pointing device 401 at destination 403 itself, instead of a path (e.g., path 305) to destination 403. According to one example, the technique illustrated in FIG. 4 may be useful where user 402 desires to locate another user, e.g., in a crowded area. For example, user 402 may (e.g., via user input module 229) identify the other user, and point device 401 until device 401 indicates that destination 403 (the other user) is located in path along which device 401 is pointed. Accordingly, user 402 may quickly determine a location of destination 403 (e.g., the other user), without manually correlating the user's surroundings with a map or other form of directional feedback.

In some examples, device 401 may be configured to determine whether device 401 is pointed consistent with destination 403 based on comparison of a detected characteristic of device in space to one or more predetermined thresholds. For example, as shown in FIG. 4, device 401 may be configured to compare a detected characteristic such as a direction (e.g., using a magnetometer sensor 236 as described above) to a predefined angular range 415 (e.g., 30 degrees, 60 degrees) to determine whether device 401 is pointed consistent with destination 403. For example, if the predefined angular range is 30 degrees, device 401 may determine that device 401 is held consistent with destination 403 if device is held at a position between −15 and +15 degrees with respect to an actual direction of destination 403. If device 401 is held at a position outside of −15 and +15 degrees with respect to an actual direction of destination 403, device 401 may not provide directional feedback to user 402.

Figure 5:
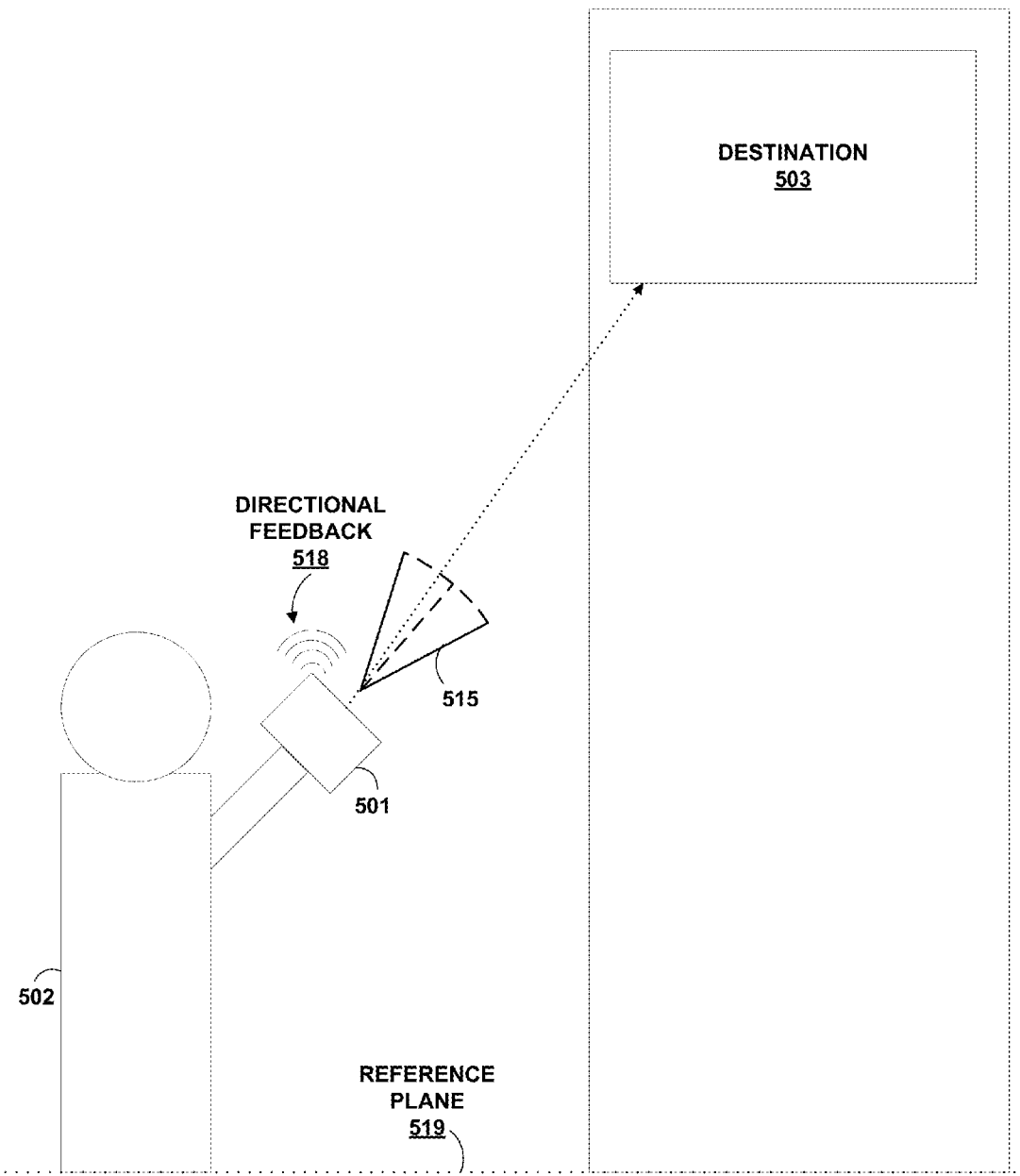
FIG. 5 is a conceptual diagram that illustrates one example of how a mobile device may be used to provide directional feedback in accordance with the techniques of this disclosure.

FIG. 5 is a conceptual diagram that illustrates another example of how a device 501 may be used to provide directional feedback 518 to a user 502, in accordance with the techniques of this disclosure. The example of FIG. 5 is substantially similar to the example of FIG. 4, where device 501 is configured to provide directional feedback 518 to a user if device 501 is pointed consistent with destination 504. However, unlike the example of FIG. 4, device 501 depicted in FIG. 5 may be further configured to provide feedback regarding a destination 504, which is vertically displaced from user 502. For example, as shown in FIG. 5, destination 503 is at a higher elevation than user 502. For example, destination 503 may be on a different floor of a building than user 504. According to this example, device 501 may be configured to detect that a user is pointing device at an angle of inclination with respect to reference plane 519 (e.g., the ground upon which user 502 is standing).

In some examples, device 501 may be configured to determine whether device 501 is pointed consistent with destination 503 based on comparison of a detected characteristic of device in space to one or more predetermined thresholds. For example, as shown in FIG. 5, device 501 may be configured to compare a detected characteristic such as an angle of elevation with respect to a reference plane 519 (e.g., using a gyroscope sensor 234 and/or accelerometer sensor 238 as described above) to a predefined vertical angular range 515 (e.g., 30 degrees, 60 degrees) to determine whether device 501 is pointed consistent with destination 503. For example, if the predefined vertical angular range is 30 degrees, device 501 may determine that device 501 is held consistent with destination 503 if device is held at a position between −15 and +15 degrees with respect to an actual direction of destination 503. If device 501 is held at a position outside of −15 and +15 degrees with respect to an actual direction of destination 503, device 501 may not provide directional feedback to user 502.

In some examples, device 501 may be configured to determine whether device 501 is held consistent with destination 503 both horizontally and vertically. According to these examples, device 501 may be configured to compare both a predefined vertical angular range 515 as depicted in FIG. 5, as well as a predefined horizontal angular range 415 as depicted in FIG. 4. If device 501 is held consistent with both of ranges 515, 415, device 501 may provide user 501 with directional feedback 518.

Figure 6:
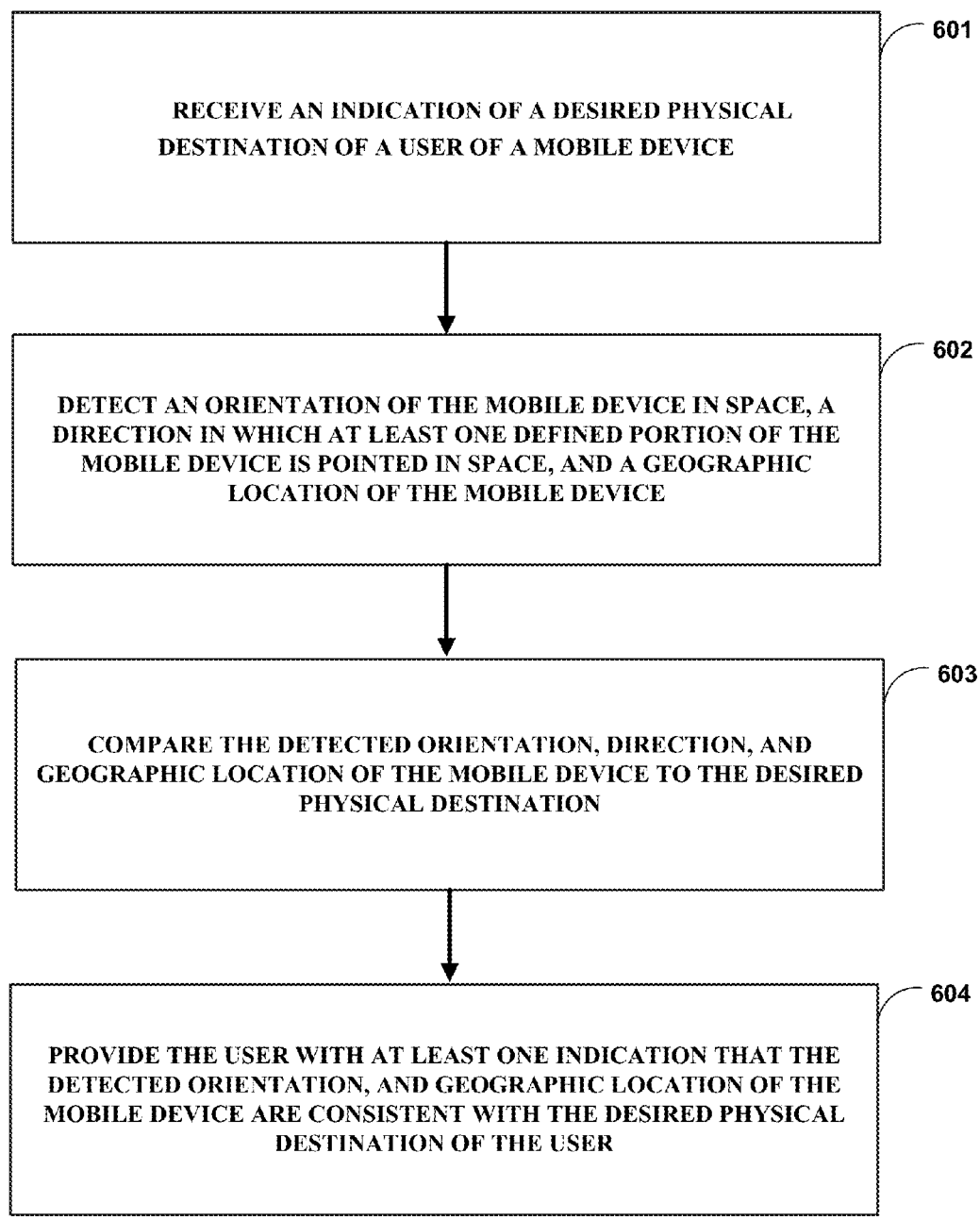
FIG. 6 is flow chart that illustrates one example of a method of operating a mobile device consistent with the techniques of this disclosure.

FIG. 6 is a flow diagram that illustrates one example of a method consistent with the techniques of this disclosure. As shown in FIG. 6, a mobile device (101) may identify (e.g., using user input module 229) a desired physical destination (103) of a user (102) of the mobile device (601). For example, the mobile device may receive one or more direct (e.g., address, coordinate location) or indirect (e.g., place name, identification of other user) indications of a desired destination (103) of the user. As also shown in FIG. 6, the mobile device may detect (e.g., using sensor module 228) an orientation and/or altitude (e.g., using one or more gyroscope 234 and/or accelerometer 238 sensors) of the mobile device in space, a direction in which at least one defined portion of the mobile device is pointed in space (e.g., using one or more magnetometer sensors 236), and/or a geographic location of the mobile device (e.g., using one or more GPS sensors 232) (602).

As also shown in FIG. 6, the mobile device (e.g., DFM 221) may compare the detected orientation, direction, and geographic location of the mobile device to the identified desired physical destination of the user to determine whether the detected orientation, direction, and geographic location of the mobile device is consistent with the desired destination or path to the desired destination (603). According to one example, the mobile device may compare the detected orientation, direction, and geographic location of the mobile device to at least one predetermined threshold (e.g., predetermined horizontal angular range 315, 415, or predetermined vertical angular range 515) to determine whether the detected orientation, direction, and geographic location of the mobile device is consistent with the desired destination or path to the desired destination.

As also shown in FIG. 6, the mobile device (e.g., DFM 221) may, if the detected orientation, direction, and geographic location of the mobile device is consistent with the desired destination or path to the desired destination, provide the user with at least one indication that the detected orientation, direction, and geographic location of the mobile device is consistent with the desired physical destination or path to the desired physical destination (604). In some examples, the at least one indication may be a palpable indication that is easily recognizable by a user. For example, the at least one indication may be a vibration of the mobile phone, or emission of high intensity light configured to be easily recognizable by the user in many environments. In one example, device 101 may be equipped with one or more ancillary (e.g., non-display) light emitting elements, e.g., one or more high intensity strobe LED configured to provide a user with one or more palpable indications of directional feedback.

Figure 7:
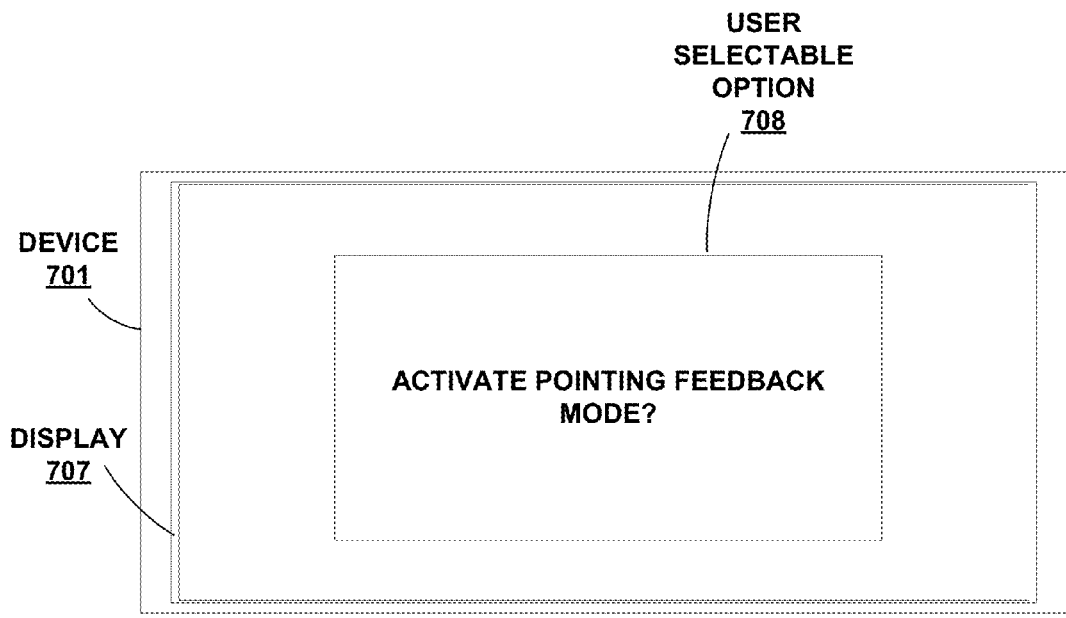
FIG. 7 is a conceptual diagram that illustrates one example of a user interface provided using a mobile device display consistent with the techniques of this disclosure.

FIG. 7 is a conceptual diagram that illustrates one example of device 701 configured to present a user with an option to activate directional feedback consistent with the techniques of this disclosure. In some cases, in order to reduce an amount of battery power (e.g., energy stored by battery 226) consumed by device 701, it may be desirable to limit operation of device 701 to provide directional feedback as described above. For example, it may be desirable for device 701 not to attempt to detect an orientation and/or altitude, direction and/or a geographic location of the mobile device, and/or to compare determined orientation and/or altitude, direction and/or a geographic location of the mobile device to a desired destination of a user unless the user desires to receive directional feedback.

As shown in FIG. 7, device 701 may be configured to provide a user with an option 708 (e.g., a selectable button presented using a device 701 display 707, an external button of device 701, a pull-down menu, or other form of user input) to select whether or not to activate directional feedback techniques as described herein. According to other examples not depicted in FIG. 7, device 701 may be configured to automatically determine when to activate directional feedback techniques as described herein. For example, device 701 may be configured to, based on one or more sensors of device (e.g., gyroscope sensor 234, accelerometer 238), whether device 701 has been removed from a user's pocket and/or whether device 701 is being held in a position/orientation that may indicate that the user desires directional feedback. For example, device 701 may be configured to determine whether a user is holding device 701 outwardly from the user, which may thereby indicate that the user desires directional feedback.

As another example, device 701 may include one or more touch-sensors, heat sensors, or other sensors configured to detect that device 701 is being held by the user. According to each of the examples described above, once it is determined that device 701 is being held by a user and/or that the device is being held in a position that may indicate that the user desires directional feedback, device 701 may automatically initiate determining whether a detected orientation, direction, and/or geographic location of the mobile device is consistent with the desired destination or path to the desired destination.

Figure 8:
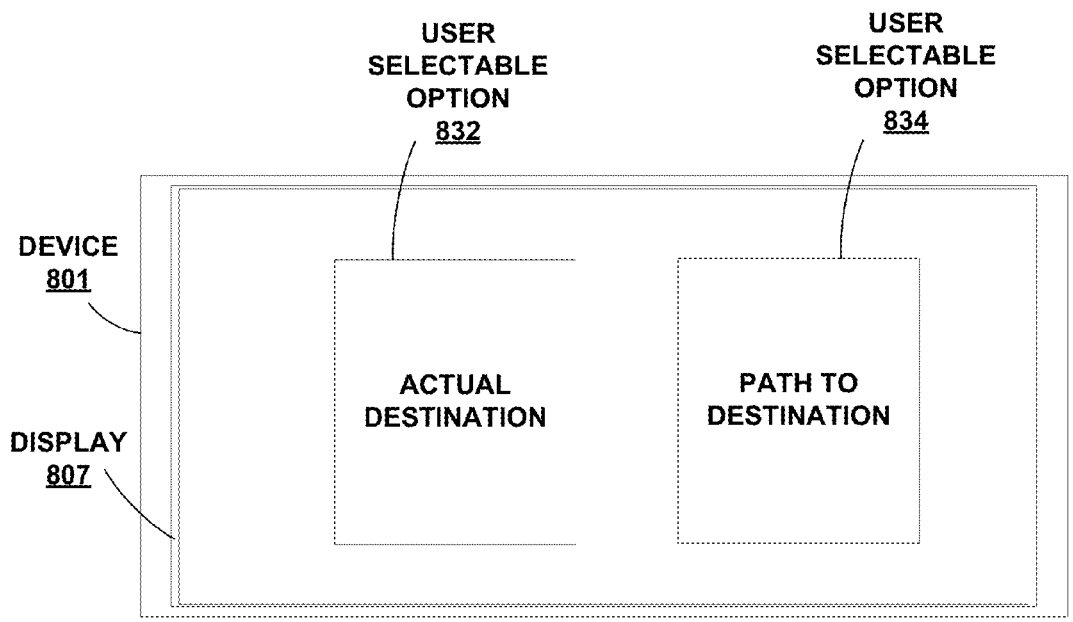
FIG. 8 is a conceptual diagram that illustrates one example of a user interface provided using a mobile device display consistent with the techniques of this disclosure.

FIG. 8 is a conceptual diagram that illustrates one example of a device 801 configured to present a user with an option to request assistance to locate a desired destination or a path to a desired destination consistent with the techniques of this disclosure. As described above, a device 801 as described herein may be configured to provide a user with directional feedback with regard to a path to a desired destination (as described with respect to FIG. 3), or to a desired destination itself (as described above with respect to FIGS. 4 and 5). As shown in FIG. 8, device 801 may be configured to provide a user with an option to receive directional feedback regarding either a path to a desired destination 832 or directional feedback regarding the desired destination itself 843. In some non-limiting examples, a user option 832, 843 as depicted in FIG. 8 may include a selectable button presented via a device 801 display 842, an external button of device 801, a pull-down menu, or other form of user input.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
    detecting, by a mobile device, a direction in which at least one portion of the mobile device is pointed in space;
    determining, by the mobile device, a geographic location of the mobile device;
    detecting, by the mobile device, an altitude and angle of elevation of the mobile device in space relative to a reference plane;
    determining, based on data from one or more sensors of the mobile device, whether the mobile device is being held in a particular position or orientation that is indicative of a user of the mobile device desiring directional feedback;
    comparing, by the mobile device, the detected direction and geographic location of the mobile device to a physical destination that was previously specified by the user;
    comparing, by the mobile device, the detected altitude and angle of elevation of the mobile device in space to the physical destination of the mobile device;
    responsive to determining that the detected direction and geographic location of the mobile device are consistent with the physical destination and to determining that the mobile device is being held in the particular position or orientation, outputting, by the mobile device, at least one indication that the detected direction and geographic location are consistent with the physical destination; and
    responsive to determining that the detected altitude and angle of elevation of the mobile device are consistent with the physical destination, outputting by the mobile device, at least one indication that the detected altitude and angle of elevation of the mobile device are consistent with the physical destination.

2. The method of claim 1, wherein the one or more sensors of the mobile device include at least one of: a gyroscope sensor, an accelerometer, a touch sensor, and a heat sensor.

3. The method of claim 1, wherein comparing the detected direction and geographic location of the mobile device to the physical destination comprises, in response to determining that the mobile device is being held in the particular position or orientation, automatically initiating, by the mobile device, a comparison of the detected direction and geographic location of the mobile device to the physical destination.

4. The method of claim 1, wherein determining whether the mobile device is being held in the particular position or orientation comprises determining, by the mobile device, whether the mobile device is being held outwardly from the user of the mobile device.

5. The method of claim 1, wherein determining whether the mobile device is being held in the particular position or orientation comprises determining, by the mobile device, whether the mobile device has been removed from a pocket of the user.

6. The method of claim 1, wherein outputting the at least one indication that the direction and geographic location are consistent with the physical destination includes outputting, by the computing device, at least one palpable indication.

7. The method of claim 1, wherein outputting the at least one indication that the direction and geographic location are consistent with the physical destination includes outputting, by the mobile device, an indication that a location pointed at by the mobile device is the physical destination.

8. The method of claim 1, wherein outputting the at least one indication that the direction and geographic location are consistent with the physical destination includes outputting, by the mobile device, an indication that the direction in which the mobile device is pointed lies along a path to the physical destination.

9. A mobile device comprising:
    one or more sensors;
    one or more output mechanisms; and
    one or more processors configured to:
        detect, based on data from the one or more sensors, a direction in which at least one defined portion of the mobile device is pointed in space, and a geographic location of the mobile device;
        detect an altitude and angle of elevation of the mobile device in space relative to a reference plane;
        determine, based on data from the one or more sensors, whether the mobile device is being held in a particular position or orientation that is indicative of a user of the mobile device desiring directional feedback; and
        compare the detected direction and geographic location of the mobile device to a physical destination that was previously specified by the user;
        compare the detected altitude and angle of elevation of the mobile device in space to the physical destination of the mobile device;
    responsive to determining that the detected direction and geographic location of the mobile device are consistent with the physical destination and to determining that the mobile device is being held in the particular position or orientation, the one or more output mechanisms output at least one indication that the detected direction and geographic location are consistent with the physical destination; and
    responsive to determining that the detected altitude and angle of elevation of the mobile device are consistent with the physical destination, the one or more output mechanisms output at least one indication that the detected altitude and angle of elevation of the mobile device are consistent with the physical destination.

10. The mobile device of claim 9, wherein the one or more sensors of the mobile device include at least one of: a gyroscope sensor, an accelerometer, a touch sensor, and a heat sensor.

11. The mobile device of claim 9, wherein the one or more processors are configured such that the one or more processors automatically initiate, in response to determining that the mobile device is being held in the particular position or orientation, a comparison of the detected direction and geographic location of the mobile device to the physical destination.

12. The mobile device of claim 9, wherein to determine whether the mobile device is being held in the particular position or orientation, the one or more processors determine whether the mobile device is being held outwardly from the user of the mobile device.

13. The mobile device of claim 9, wherein to determine whether the mobile device is being held in the particular position or orientation, the one or more processors determine whether the mobile device has been removed from a pocket of the user.

14. The mobile device of claim 9, wherein the one or more output mechanisms output the at least one indication that the direction and geographic location are consistent with the physical destination by outputting at least one palpable indication.

15. The mobile device of claim 9, wherein the one or more output mechanisms output the at least one indication that the direction and geographic location are consistent with the physical destination by outputting an indication that a location pointed at by the mobile device is the physical destination.

16. The mobile device of claim 9, wherein the one or more output mechanisms output the at least one indication that the direction and geographic location are consistent with the physical destination by outputting an indication that the direction in which the mobile device is pointed lies along a path to the physical destination.

17. A non-transitory computer-readable data storage medium having instructions stored thereon that, when executed, cause one or more processors of a mobile device to:

detect a direction in which at least one portion of the mobile device is pointed in space, determine a geographic location of the mobile device;

detect an altitude and angle of elevation of the mobile device in space relative to a reference plane;

determine, based on data from one or more sensors of the mobile device, whether the mobile device is being held in a particular position or orientation that is indicative of a user of the mobile device desiring directional feedback;

compare the detected direction and geographic location of the mobile device to a physical destination that was previously specified by the user;

compare the detected altitude and angle of elevation of the mobile device in space to the physical destination of the mobile device;

responsive to determining that the detected direction and geographic location of the mobile device are consistent with the physical destination and to determining that the mobile device is being held in the particular position or orientation, output at least one indication that the detected direction and geographic location are consistent with the physical destination; and responsive to determining that the detected altitude and angle of elevation of the mobile device are consistent with the physical destination, output at least one indication that the detected altitude and angle of elevation of the mobile device are consistent with the physical destination.

18. The non-transitory computer-readable data storage medium of claim 17, wherein the instructions, when executed, cause the one or more processors to determine whether the mobile device is being held in the particular position or orientation by determining whether the mobile device is being held outwardly from the user of the mobile device.

* * * * *